United States Patent
Zhang et al.

(10) Patent No.: US 12,222,331 B1
(45) Date of Patent: Feb. 11, 2025

(54) SYSTEMS AND METHODS FOR IMPACT TESTING AND MONITORING OF HIGH-ENERGY FLEXIBLE NETS

(71) Applicants: RAILWAY ENGINEERING RESEARCH INSTITUTE, CHINA ACADEMY OF RAILWAY SCIENCES CO., LTD., Beijing (CN); CHINA ACADEMY OF RAILWAY SCIENCES CO., LTD., Beijing (CN)

(72) Inventors: Yufang Zhang, Beijing (CN); Kun Yuan, Beijing (CN); Xiaobing Li, Beijing (CN); Yong Yao, Beijing (CN); Tao Jia, Beijing (CN); Lining Du, Beijing (CN); Tao Wei, Beijing (CN); Wenchao Zhang, Beijing (CN); Jian Cui, Beijing (CN); Bo Liu, Beijing (CN); Jian Li, Beijing (CN); Yu Cheng, Beijing (CN); Shengyong Zeng, Beijing (CN); Shuangquan Lei, Beijing (CN); Shiwen Huang, Beijing (CN); Wenxin Tan, Beijing (CN); Junjie Zeng, Beijing (CN); Hao Lan, Beijing (CN); Jiawei Fan, Beijing (CN); Ning Xuan, Beijing (CN); Peng Zhang, Beijing (CN); Gongming Chen, Beijing (CN); Pan Chen, Beijing (CN); Fei Xian, Beijing (CN); Zehua Dong, Beijing (CN)

(73) Assignees: RAILWAY ENGINEERING RESEARCH INSTITUTE, CHINA ACADEMY OF RAILWAY SCIENCES CO., LTD., Beijing (CN); CHINA ACADEMY OF RAILWAY SCIENCES CO., LTD., Beijing (CN)

( * ) Notice: Subject to any disclaimer, the term of this patent is extended or adjusted under 35 U.S.C. 154(b) by 0 days.

(21) Appl. No.: 18/898,659

(22) Filed: Sep. 26, 2024

(30) Foreign Application Priority Data

May 21, 2024 (CN) .......................... 202410630065.8

(51) Int. Cl.
*G01N 3/30* (2006.01)
*E01F 7/04* (2006.01)

(52) U.S. Cl.
CPC ............... *G01N 3/30* (2013.01); *E01F 7/045* (2013.01)

(58) Field of Classification Search
CPC .................................. G01N 3/30; E01F 7/045
See application file for complete search history.

(56) References Cited

U.S. PATENT DOCUMENTS

| | | | |
|---|---|---|---|
| 2008/0157044 A1* | 7/2008 | Barfield | E02B 3/04 256/12.5 |
| 2011/0013992 A1* | 1/2011 | Fujii | G06F 30/00 703/1 |

(Continued)

FOREIGN PATENT DOCUMENTS

| | | |
|---|---|---|
| CN | 105133672 A | 12/2015 |
| CN | 109186916 A | 1/2019 |

(Continued)

OTHER PUBLICATIONS

EOTA European Assessment Document—Falling Rock Protection Kits; see Annex A on p. 22 (Year: 2018).*

(Continued)

*Primary Examiner* — Nathaniel T Woodward
*Assistant Examiner* — Philip L Cotey
(74) *Attorney, Agent, or Firm* — PORUS IP LLC

(57) ABSTRACT

Provided are a system and a method for impact testing and monitoring of a high-energy flexible net. The system (Continued)

includes a vertical impact testing unit, a slope impact testing unit, an impact simulation unit, and an impact monitoring unit. The vertical impact testing unit includes a vertically positioned gravity wall. The slope impact testing unit includes a wall slope positioned perpendicularly to a second side of the gravity wall. A first side of the gravity wall and a slope surface of the wall slope are securely provided with a flexible net, respectively. The impact simulation unit includes an impact assembly and a lifting assembly. The impact monitoring unit is configured to monitor a deformation result and an internal force change result of the flexible net.

9 Claims, 6 Drawing Sheets

(56) References Cited

U.S. PATENT DOCUMENTS

| | | | | |
|---|---|---|---|---|
| 2012/0132876 A1* | 5/2012 | Nishita | ............... | E01F 7/04 |
| | | | | 256/12.5 |
| 2017/0121919 A1* | 5/2017 | Orgnoni | ............... | B21F 27/02 |
| 2019/0344328 A1* | 11/2019 | Wendeler-Goeggelmann | ............ | |
| | | | | E01F 7/04 |
| 2020/0232172 A1* | 7/2020 | Lanter | ............... | F16F 7/128 |
| 2020/0308785 A1* | 10/2020 | Sennhauser | ............ | E01F 7/04 |
| 2021/0023605 A1* | 1/2021 | Ferraiolo | ............... | B21F 27/02 |

FOREIGN PATENT DOCUMENTS

| | | |
|---|---|---|
| CN | 110196147 A | 9/2019 |
| CN | 112924129 A | 6/2021 |
| CN | 114878130 A | 8/2022 |
| CN | 117232999 A | 12/2023 |
| DE | 202020105498 01 | 10/2020 |
| JP | 2020091180 A | 6/2020 |
| WO | 2023236897 A1 | 12/2023 |

OTHER PUBLICATIONS

First Office Action in Chinese Application No. 202410630065.8 mailed on Jun. 20, 2024, 19 pages.

Notification to Grant Patent Right for Invention in Chinese Application No. 202410630065.8 mailed on Jul. 15, 2024, 4 pages.

Yu, Zhixiang et al.,Study on impact resistance of a resilient steel canopy protection system, Chinese Journal of Rock Mechanics and Engineering, 39(12): 2505-2516, 2020.

* cited by examiner

SYSTEMS AND METHODS FOR IMPACT TESTING AND MONITORING OF HIGH-ENERGY FLEXIBLE NETS

CROSS-REFERENCE TO RELATED APPLICATIONS

This application claims priority to Chinese Patent Application No. 202410630065.8, filed on May 21, 2024, the entire content of which is incorporated herein by reference.

TECHNICAL FIELD

The present disclosure relates to the technical field of flexible net testing, and in particular, relates to a system and a method for impact testing and monitoring of a high-energy flexible net.

BACKGROUND

With the rapid development of the economy, transportation infrastructure is continuously extending into mountainous regions. The complex terrain and topography of the mountainous regions frequently lead to slope rockfall disasters. Particularly on both sides of a road and below the hillside, rockfalls and landslides are common, posing significant risks to safe travel and the use of facilities. High-altitude rockfalls are characterized by large height differences, high energy, significant impact forces, and substantial destructive effects, severely threatening the operational safety of transportation infrastructure. Therefore, there is an urgent need to research a flexible barrier structure with an ultra-high energy level and to develop a testing platform for assessing an impact resistance capability of the flexible barrier structure with the ultra-high energy level to evaluate the impact resistance of the flexible barrier structure of the ultra-high energy level.

To test the impact resistance performance of barrier structures, CN114878130A discloses an information-based and integrated platform for testing prevention and mitigation of geo-hazards. The platform, which is transformed from a natural slope, integrates a direct impact test and an inclined impact test, enabling the testing of a protective system against various geological hazard bodies such as rockfalls, debris flows, and landslides, thereby meeting testing requirements for different hazards and structures. However, the natural slope's stability is often compromised by vibrations from the tests, resulting in outcomes that fail to meet design expectations. Additionally, reliance of the platform on the natural slope limits applicability of the platform, and the platform lacks a capability to adjust an initial impact load during slope tests.

Therefore, it is desirable to provide a system and a method for impact testing and monitoring of a high-energy flexible net that offer high impact energy, diverse functionality, and strong adaptability.

SUMMARY

In response to the defects in the prior art, the present disclosure provides a system and a method for impact testing and monitoring of a high-energy flexible net. Based on a vertical impact testing unit and a slope impact testing unit of the system, the system may be used as a base for carrying out detection, testing, and development of a protective structure against impacts, collisions, and strikes such as high-energy collapses, rockfalls, bridge collisions, debris flows, etc.

One or more embodiments of the present disclosure provide a system for impact testing and monitoring of a high-energy flexible net. The system comprises a vertical impact testing unit, a slope impact testing unit, an impact simulation unit, and an impact monitoring unit. The vertical impact testing unit includes a vertically positioned gravity wall. The slope impact testing unit includes a wall slope, a first side of the gravity wall and a slope surface of the wall slope are securely provided with a flexible net, respectively, the wall slope being positioned perpendicularly to a second side of the gravity wall. The impact simulation unit includes an impact assembly and a lifting assembly, wherein the impact assembly is provided on the slope surface of the wall slope and configured to provide an impact angle for an impactor performing a slope impact test, the impact assembly includes a power device, a support plate, and a driving device. An upper end of the support plate is rotationally connected to the slope surface of the wall slope, and a lower end of the support plate is movably connected to an output end of the driving device. The driving device is provided on the slope surface of the wall slope to adjust an angle between the support plate and the slope surface of the wall slope. The power device is fixed to the upper end of the support plate, and an output end of the power device is configured to apply an impact velocity parallel to the support plate to the impactor performing the slope impact test. The lifting assembly is provided close to the gravity wall and the wall slope. The lifting assembly is configured to lift the impactor performing the slope impact test to the impact assembly, and lift an impactor performing a vertical impact test to a predetermined position and release the impactor. A height of the predetermined position is not less than 100 m, the impact angle of the impact assembly is in a range of 45° to 70°, and an impact velocity of the impactor performing the vertical impact test and the impact velocity of the impactor performing the slope impact test are not less than 35 m/s. The impact monitoring unit is configured to monitor a deformation result and an internal force change result of the flexible net.

In some embodiments, the slope surface of the wall slope is inclined downwardly in a direction away from the impact simulation unit, a width of the slope surface of the wall slope is in a range of 4 m to 6 m, an angle between the slope surface of the wall slope and a horizontal plane is in a range of 30° to 45°, and a projected length of the slope surface on the horizontal plane is in a range of 40 m to 60 m.

In some embodiments, the flexible net is fixed to the gravity wall by a first fixing structure, and the flexible net is fixed to the wall slope by a second fixing structure. The first fixing structure includes a plurality of first columns and a plurality of first cables. The plurality of first columns are vertically fixed to the gravity wall and arranged in a plane parallel to the horizontal plane, and there is a spacing between two adjacent first columns of the plurality of first columns. A top of each of the plurality of first columns is fixed to one end of at least one of the plurality of first cables, another end of the at least one of the plurality of first cables is fixed to the first side of the gravity wall. The second fixing structure includes a plurality of second columns and a plurality of second cables. The plurality of second columns are fixed to the wall slope, wherein one end of each of the plurality of second cables is fixed to the slope surface of the wall slope, another ends of a portion of the plurality of second cables are fixed to a top of one of the plurality of second columns, and another end of each second cable of the remaining portion of the plurality of second cables is fixed to the flexible net.

In some embodiments, the impact monitoring unit includes a plurality of image acquisition assemblies and a plurality of tensile sensors. The plurality of image acquisition assemblies are fixed to the gravity wall and the slope surface of the wall slope to monitor the deformation result of the flexible net, and the plurality of tensile sensors are fixed to the plurality first cables and the plurality second cables to monitor the internal force change result of the flexible net.

In some embodiments, a width of the gravity wall satisfies a relationship represented as:

$$B_{zlq} \geq B_{bdw} + B_{bdwg} + B_{cgq} + B_{fu}$$

wherein $B_{zlq}$ denotes the width of the gravity wall, $B_{bdw}$ denotes a maximum width of the flexible net fixed to the gravity wall, $B_{bdwg}$ denotes a width of the first fixing structure on an outer side of the flexible net fixed to the gravity wall, $B_{cgq}$ denotes a width of the plurality of image acquisition assemblies on the gravity wall, $B_{fu}$ denotes an excess width, and 1 m≤$B_{fu}$≤5 m.

In some embodiments, a height of the gravity wall satisfies a relationship represented as:

$$H_{zlq} \geq H_{bhc} + H_{cgq} + H_{fu}$$

wherein $H_{zlg}$ denotes the height of the gravity wall, $H_{bhc}$ denotes a maximum buffer distance of the flexible net fixed to the gravity wall, $H_{cgq}$ denotes a height of the plurality of image acquisition assemblies on the gravity wall, $H_{fu}$ denotes an excess height, and 1 m≤$H_{fu}$≤3 m.

In some embodiments, a thickness of the gravity wall satisfies a relationship represented as:

$$S_{zlq} \geq \sqrt{\frac{W_{max} h}{\rho g H_{zlq} B_{zlq}}}$$

wherein $S_{zlq}$ denotes the thickness of the gravity wall, $W_{max}$ denotes a maximum impact energy of the vertical impact testing unit, h denotes a height of the flexible net fixed to the gravity wall, $\rho$ denotes a density of the impactor performing the vertical impact test, g denotes a gravitational acceleration, $H_{zlq}$ denotes the height of the gravity wall, and $B_{zlq}$ denotes the width of the gravity wall.

In some embodiments, the lifting assembly includes a support body and a hoisting device, the support body is provided between the second side of the gravity wall and the wall slope, the hoisting device is a tower crane, the tower crane including a tower crane column provided at a top of the support body, a slewing mechanism, and a movable arm, wherein the movable arm is rotationally fixed to a top of the tower crane column by the slewing mechanism and is rotationally provided on the slewing mechanism in a direction perpendicular to the horizontal plane.

In some embodiments, the support body is a cylindrical tower structure formed by double-layered shear walls including an inner shear wall and an outer shear wall, and the tower structure is provided with a plurality of floors along a height direction of the tower structure, the plurality of floors being enclosed by a plurality of floor surfaces spaced apart along the height direction and the double-layered shear walls, the outer shear wall of the support body is provided with a plurality of sets of openings in the height direction, each set of the plurality of sets of openings is provided on the outer shear wall between adjacent floors and correspond to one of the plurality of floors, respectively.

In some embodiments, a relationship between a vertical lifting angle of the movable arm and an impact energy of the vertical impact testing unit is represented as:

$$\alpha = \arcsin\left(\frac{W}{mgL_{db}} - \frac{H_{tl} + H_{tdlz} - H_{ds} - H_{bhc}}{L_{db}}\right)$$

wherein $\alpha$ denotes the vertical lifting angle of the movable arm, W denotes the impact energy of the vertical impact testing unit, m denotes a mass of the impactor performing the vertical impact test, g denotes the gravitational acceleration, $L_{db}$ denotes a length of the movable arm, $H_{tl}$ denotes a height of the support body, $H_{tdlz}$ denotes a height of the tower crane column, $H_{ds}$ denotes a vertical height between the impactor performing the vertical impact test and the movable arm, and $H_{bhc}$ denotes a buffering distance of the flexible net fixed to the gravity wall.

One or more embodiments of the present disclosure provide a method for impact testing and monitoring of a high-energy flexible net. The method is implemented by using the system for impact test and monitoring of a high-energy flexible net described above, and the method comprises: arranging a flexible net to be tested on the vertical impact testing unit or the slope impact testing unit; lifting an impactor to a predetermined location using the lifting assembly and then releasing the impactor to achieve an impact on the flexible net to be tested on the vertical impact testing unit; or lifting an impactor to a location of the impact assembly using the lifting assembly, and providing the impactor with a predetermined impact angle and an impact velocity using the impact assembly to achieve an impact on the flexible net to be tested on the slope impact testing unit; and obtaining a deformation result and an internal force change result of the flexible net to be tested on the vertical impact testing unit or the slope impact testing unit using the impact monitoring unit.

The system and method for impact testing and monitoring of a high-energy flexible net provided in the present disclosure may have at least the following beneficial effects.

(1) The vertical impact testing unit and the slope impact testing unit are provided with structures such as a passive protection net, a barrier net, or the like, which allows for ultra-high-energy vertical impact tests in the vertical impact testing unit and slope impact tests under various impact conditions in the slope impact testing unit. In addition, monitoring data may be obtained in real time from the impact monitoring unit, which enables the analysis of stress conditions of the passive protection net, the barrier net, or the like.

(2) The impact energy level of the system in the vertical impact testing unit can reach up to 20,000 kJ, and a vertical impact velocity can reach to 44.72 m/s. The slope impact testing unit can accommodate impact angles ranging from 45° to 70° and various slope impact velocities, and an impact energy of the slope impact testing unit can reach to 5,000 kJ.

(3) The structure and specification parameters of the hoisting device are designed to provide a large load capacity to meet the requirements of high-energy impact testing. The double-layer cylindrical tower structure enhances load-bearing capacity while keeping costs low, allowing the hoisting device to perform high-energy impact tests. Additionally, specifying the parameters of the support body ensures a high height (or a high-energy level) while maintaining low costs. The set of openings in each floor of the support body can improve wind resistance while reducing costs.

(4) Based on the configuration of the lifting device and support body, during vertical impact tests, the vertical lifting angle of the movable arm of the hoisting device can be adjusted according to the required impact energy (impact energy level) to achieve a target impact energy, which allows for the implementation of vertical impact tests at a desired energy level.

(5) With the arrangement of the wall slope and impact assembly, during slope impact tests, the support plate can be adjusted to achieve a desired impact angle. Additionally, the force output from the power device can be adjusted based on the required impact energy and the determined impact angle, ensuring that the impactor achieves a target impact angle and a target energy level after interacting with the impact assembly, thereby enabling the completion of the slope impact test for the flexible net at a corresponding energy level.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

Figure 1:
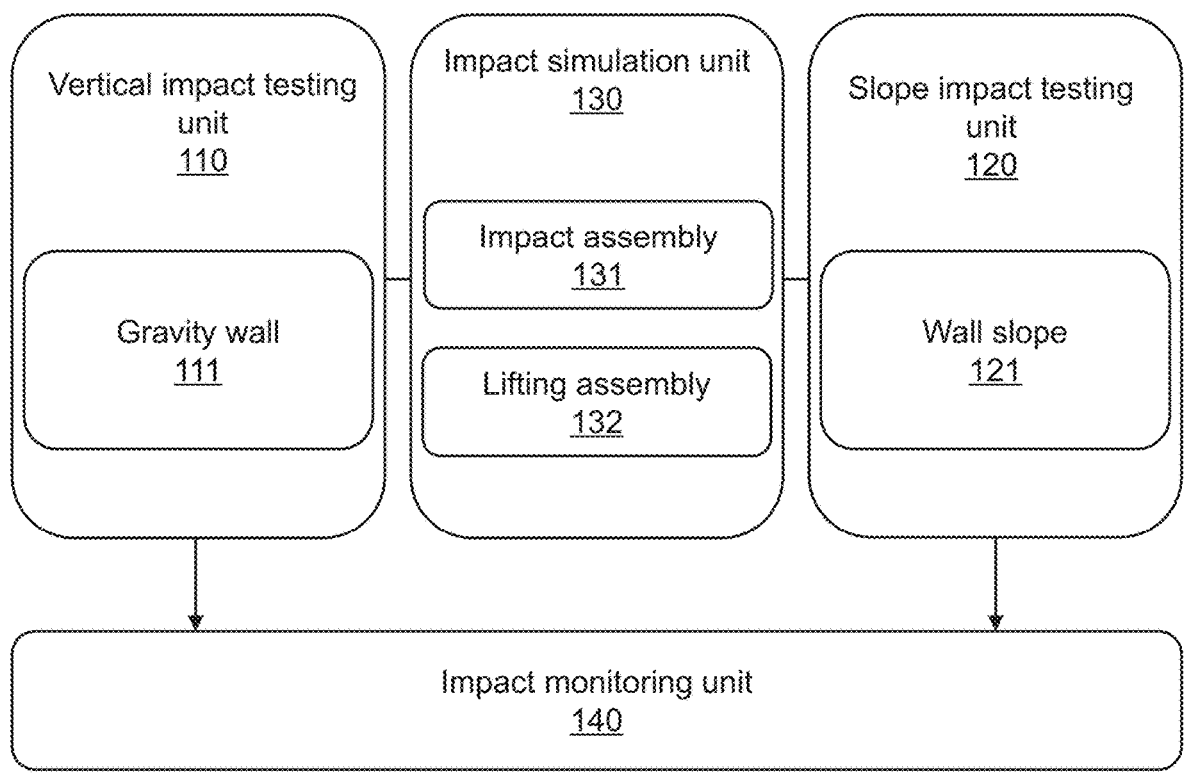
FIG. 1 is a schematic modular diagram of a system for impact testing and monitoring of a high-energy flexible net according to some embodiments of the present disclosure.

Reference numbers in the drawings: 110 denotes a vertical impact testing unit; 111 denotes a gravity wall; 112 denotes a first flexible net; 120 denotes a slope impact testing unit; 121 denotes a wall slope; 122 denotes a second flexible net; 130 denotes an impact simulation unit; 131 denotes a lifting assembly; 132 denotes an impact assembly; 140 denotes an impact monitoring unit; 210 denotes a support body; 220 denotes a hoisting device; 230 denotes an impactor; 310 denotes a support plate; 320 denotes a power device; 330 denotes a driving device; 400 denotes a first fixing structure; 410 denotes first columns; 420 denotes first cables; 500 denotes a second fixing structure; 510 denotes second columns; and 520 denotes second cables.

DETAILED DESCRIPTION

In order to more clearly illustrate the technical solutions of the embodiments of the present disclosure, the accompanying drawings to be used in the description of the embodiments will be briefly described below. Obviously, the accompanying drawings in the following description are only some examples or embodiments of the present disclosure, and that the present disclosure may be applied to other similar scenarios in accordance with these drawings without creative labor for those of ordinary skill in the art. Unless obviously acquired from the context or the context illustrates otherwise, the same numeral in the drawings refers to the same structure or operation.

It should be understood that "system," "device," "unit," and/or "module" as used herein is a way to distinguish between different components, elements, parts, sections, or assemblies at different levels. However, these words may be replaced by other expressions if they accomplish the same purpose.

As indicated in the present disclosure and in the claims, the singular forms "a," "an," and "the" may be intended to include the plural forms as well, unless the context clearly indicates otherwise. In general, the terms "comprise," "comprises," and/or "comprising," "include," "includes," and/or "including," when used in this disclosure, specify the presence of stated features, integers, steps, operations, elements, and/or components, but do not preclude the presence or addition of one or more other features, integers, steps, operations, elements, components, and/or groups thereof.

The main problems of existing platforms for testing impact resistance are as follows.

(1) The technical difficulty of constructing a reaction wall test site is high, resulting in low test energy levels and difficulty in conducting a guided test.

The reaction wall test site is primarily composed of a reaction wall and lifting equipment, which may be relatively simple to construct. However, due to the technical difficulty of creating an artificial tall slope and the need for ultra-high lifting equipment, it is challenging to use manually constructed reaction walls to conduct high-energy impact resistance tests. Under current technological conditions, it is difficult to conduct guided tests on steep slopes, and the functional limitations are evident.

(2) The transformation of an in-situ test site heavily relies on natural terrain, with limited suitable locations.

Current high-energy impact resistance testing platforms mainly use an in-situ construction approach, which is suitable for mountain terrains with favorable slope geological conditions. The advantages of the in-situ construction approach include leveraging the height of the mountain to reduce the construction cost of artificial reaction walls and decrease the height of lifting equipment, making it easier to conduct tests based on actual slope geological conditions. However, the downside is the high dependency on natural terrain.

The development trends of impact resistance test platforms are analyzed as follows.

(1) Impact resistance testing platforms are evolving towards higher energy levels and higher impact velocity testing capabilities.

Due to the prevalence of high-positioned rockfall collapses along some railways, there is a significant demand for high-energy passive protection nets. Existing rockfall testing sites have relatively low test energy levels, which do not meet the requirements for developing high-performance flexible protection systems. Therefore, there is a need to establish impact resistance testing platforms with higher energy levels and impact velocities.

(2) Multi-functional impact testing platforms with guided flexible protection system testing capabilities.

The effectiveness of current impact resistance testing platforms is limited by their scale. There is a need to establish multi-functional impact testing platforms with guided flexible protection system testing capabilities, enabling the completion of testing functions for open tunnels, passive nets, and flexible protection nets, and achieving comprehensive rockfall impact platform construction.

In view of the above, in some embodiments of the present disclosure, a high impact energy, versatile, and adaptable system and method for impact testing and monitoring of a high-energy flexible net is proposed to provide a test basis for addressing the prevention of high and steep hazardous rock masses, testing of flexible protection nets, fundamental theoretical research, and the development of new technologies.

FIG. 1 is a schematic modular diagram of a system for impact testing and monitoring of a high-energy flexible net according to some embodiments of the present disclosure.

As shown in FIG. 1, a system 100 for impact testing and monitoring of a high-energy flexible net (hereinafter the impact testing and monitoring system 100) includes a vertical impact testing unit 110, a slope impact testing unit 120, an impact simulation unit 130, and an impact monitoring unit 140.

The vertical impact testing unit 110 is a unit for performing a vertical impact test. The vertical impact test is a test in which an impactor is lifted to a certain height and then released, so that the impactor falls into a barrier net in a free-falling manner, to test an impact resistance capability of the barrier net.

In some embodiments, the vertical impact testing unit 110 includes a vertically positioned gravity wall 111 and a flexible net being fixedly provided on a first side of the gravity wall 111. The flexible net fixedly provided on the first side of the gravity wall 111 is also referred to as a first flexible net. The vertically positioned gravity wall 111 refers to the gravity wall 111 being provided in a plane that is vertical to a horizontal plane or a ground.

The gravity wall 111 may be positioned perpendicular to a horizontal plane or the ground. In some embodiments, the gravity wall 111 may be a rectangular body, a trapezoidal body, or the like. The first side of the gravity wall 111 is a side of the gravity wall for securing the first flexible net.

The first flexible net is a test object of the vertical impact test. The first flexible net may be tested for impact resistance capability by the vertical impact test. In some embodiments, the first flexible net may include a passive protection net, a barrier net, or the like. The passive protection net may be composed of four main parts: a steel wire rope net or ring net (with an additional wire mesh layer for intercepting smaller rock fragments), a fixing system (including anchor bolts, interception cables, bases, and support cables), decompression rings, and steel columns. The steel columns and the wire rope net may be connected and combined to form an integrated structure, which provides surface protection for a region to be protected, thereby preventing the collapse of rocks and soil, and serving the purpose of slope protection.

In some embodiments, a net surface of the first flexible net may be perpendicular or nearly perpendicular to the first side of the gravity wall 111. In some embodiments, the net surface of the first flexible net may be inclined on the first side of the gravity wall 111 with a direction of inclination upward such that an angle between the net surface of the first flexible net and the first side of the gravity wall 111 forms an acute angle.

In some embodiments, the first flexible net may be fixed to the first side of the gravity wall by a first fixing structure. More descriptions of the first fixing structure may be found in FIG. 4 and the related descriptions thereof.

The slope impact testing unit 120 is a unit for performing a slope impact test. The slope impact test is a test in which an impactor is made to roll down a slope into a barrier net to test the impact resistance capability of the barrier net. The slope impact testing unit mainly conducts oblique impact load tests, such as tests involving collapses, rockfalls, debris flows, collisions, or the like.

In some embodiments, the slope impact testing unit 120 includes a wall slope 121, the wall slope 121 being positioned perpendicularly to a second side of the gravity wall 111. A flexible net is fixedly disposed on a slope surface of the wall slope 121. The flexible net being fixedly disposed on the slope surface of the wall slope 121 is also referred to as a second flexible net The wall slope 121 is a slope structure formed by a reinforced concrete frame shear wall structure. In some embodiments, the wall slope 121 may be configured as a trapezoidal shape, or the like. For example, the wall slope 121 may be a right-angle trapezoid.

In some embodiments, the wall slope 121 may be provided on the second side of the gravity wall 111. The second side of the gravity wall 111 is a side opposite to the first side of the gravity wall 111.

In some embodiments, a side of the wall slope 121 opposite to the sloped surface may be arranged perpendicular to the second side of the gravity wall 111. For example, the side of the wall slope 121 opposite to the sloped surface of the wall slope 121 may abut against the second side of the gravity wall 111 and be arranged perpendicular to the second side of the gravity wall 111. As another example, the side of the wall slope 121 opposite to the sloped surface of the wall slope 121 may be separated from the second side of the gravity wall 111 and be arranged perpendicular to the second side of the gravity wall 111.

In some embodiments, the slope surface of the wall slope 121 is inclined downwardly in a direction away from the impact simulation unit 130. More descriptions of the impact simulation unit may be found in the related descriptions below.

In some embodiments, a width of the slope surface of the wall slope 121 may be in a range of 4 m to 6 m. In some embodiments, the width of the slope surface of the wall slope 121 may be in one of the following ranges of: 4 m to 5.8 m, 4 m to 5.6 m, 4 m to 5.4 m, 4 m to 5.2 m, 4 m to 5 m, 4 m to 4.8 m, 4 m to 4.6 m, 4 m to 4.4 m, 4 m to 4.2 m, 4.2 m to 6 m, 4.2 m to 5.8 m, 4.2 m to 5.6 m, 4.2 m to 5.4 m, 4.2 m to 5.2 m, 4.2 m to 5 m, 4.2 m to 4.8 m, 4.2 m to 4.6 m, 4.2 m to 4.4 m, 4.4 m to 6 m, 4.4 m to 5.8 m, 4.4 m to 5.6 m, 4.4 m to 5.4 m, 4.4 m to 5.2 m, 4.4 m to 5 m, 4.4 m to 4.8 m, 4.4 m to 4.6 m, 4.6 m to 6 m, 4.6 m to 5.8 m, 4.6 m to 5.6 m, 4.6 m to 5.4 m, 4.6 m to 5.2 m, 4.6 m to 5 m, 4.6 m to 4.8 m, 4.8 m to 6 m, 4.8 m to 5.8 m, 4.8 m to 5.6 m, 4.8 m to 5.4 m, 4.8 m to 5.2 m, 4.8 m to 5 m, 5 m to 6 m, 5 m to 5.8 m, 5 m to 5.6 m, 5 m to 5.4 m, 5 m to 5.2 m, 5.2 m to 6 m, 5.2 m to 5.8 m, 5.2 m to 5.6 m, 5.2 m to 5.4 m, 5.4 m to 6 m, 5.4 m to 5.8 m, 5.4 m to 5.6 m, 5.6 m to 6 m, 5.6 m to 5.8 m, 5.8 m to 6 m, or the like. In some embodiments, the width of the slope surface of the wall slope 121 may be 4 m, 4.2 m, 4.4 m, 4.6 m, 4.8 m, 5 m, 5.2 m, 5.4 m, 5.4 m, 5.8 m, 6 m, or the like.

In some embodiments, an angle between the slope surface of the wall slope 121 and a horizontal plane may be in a range of 30° to 45°. In some embodiments, the angle between the slope surface of the wall slope 121 and a horizontal plane may be in one of the following ranges of: 30° to 31.5°, 30° to 33°, 30° to 34.5°, 30° to 36°, 30° to 37.5°, 30° to 39°, 30° to 40.5°, 30° to 42°, 30° to 43.5°, 31.5° to 33°, 31.5° to 34.5°, 31.5° to 36°, 31.5° to 37.5°, 31.5° to 39°, 31.5° to 40.5°, 31.5° to 42°, 31.5° to 43.5°, 31.5° to 45°, 33° to 34.5°, 33° to 36°, 33° to 37.5°, 33° to 39°, 33° to 40.5°, 33° to 42°, 33° to 43.5°, 33° to 45°, 34.5° to 36°, 34.5° to 37.5°, 34.5° to 39°, 34.5° to 40.5°, 34.5° to 42°, 34.5° to 43.5°, 34.5° to 45°, 36° to 37.5°, 36° to 39°, 36° to 40.5°, 36° to 42°, 36° to 43.5°, 36° to 45°, 37.5° to 39°, 37.5° to 40.5°, 37.5° to 42°, 37.5° to 43.5°, 37.5° to 45°, 39° to 40.5°, 39° to 42°, 39° to 43.5°, 39° to 45°, 40.5° to 42°, 40.5° to 43.5°, 40.5° to 45°, 42° to 43.5°, 42° to 45°, 43.5° to 45°, or the like. In some embodiments, the angle between the slope surface of the wall slope 121 and the horizontal plane may be one of 30°, 31.5°, 33°, 34.5°, 36°, 37.5°, 39°, 40.5°, 42°, 43.5°, 45°, or the like.

In some embodiments, a projected length of the slope surface of the wall slope 121 on the horizontal plane may be in a range of 40 m to 60 m. In some embodiments, the projected length of the slope surface of the wall slope 121 on the horizontal plane may be in one of the following ranges: 40 m to 42 m, 40 m to 44 m, 40 m to 46 m, 40 m to 48 m, 40 m to 50 m, 40 m to 52 m, 40 m to 54 m, 40 m to 56 m, 40 m to 58 m, 42 m to 44 m, 42 m to 46 m, 42 m to 48 m, 42 m to 50 m, 42 m to 52 m, 42 m to 54 m, 42 m to 56 m, 42 m to 58 m, 42 m to 60 m, 44 m to 46 m, 44 m to 48 m, 44 m to 50 m, 44 m to 52 m, 44 m to 54 m, 44 m to 56 m, 44 m to 58 m, 44 m to 60 m, 46 m to 48 m, 46 m to 50 m, 46 m to 52 m, 46 m to 54 m, 46 m to 56 m, 46 m to 58 m, 46 m to 60 m, 48 m to 50 m, 48 m to 52 m, 48 m to 54 m, 48 m to 56 m, 48 m to 58 m, 48 m to 60 m, 50 m to 52 m, 50 m to 54 m, 50 m to 56 m, 50 m to 58 m, 50 m to 60 m, 52 m to 54 m, 52 m to 56 m, 52 m to 58 m, 52 m to 60 m, 54 m to 56 m, 54 m to 58 m, 54 m to 60 m, 56 m to 58 m, 56 m to 60 m, 58 m to 60 m, or the like. In some embodiments, the projected length of the slope surface of the wall slope 121 on the horizontal plane may be one of 40 m, 42 m, 44 m, 46 m, 48 m, 50 m, 52 m, 54 m, 56 m, 58 m, 60 m, or the like.

The second flexible net is a test object of the slope impact test. The second flexible net may be tested for impact resistance by the slope impact test. In some embodiments, the second flexible net may be structures such as a passive protection net, a barrier net, or the like.

In some embodiments, a net surface of the second flexible net may be perpendicular or nearly perpendicular to the slope surface of the wall slope 121. In some embodiments, the net surface of the second flexible net may be inclined on the slope surface of the wall slope 121, with an inclination direction directed toward a side proximate to the impact simulation unit, such that an angle between the net surface of the second flexible net and the slope surface of the wall slope 121 forms an acute angle.

In some embodiments, the second flexible net may be fixed to the slope surface of the wall slope 121 by a second fixing structure. More descriptions of the second fixing structure may be found in FIG. 4 and the related descriptions thereof.

In some embodiments, the width of the slope surface of the wall slope 121 satisfies a relationship represented by Equation (1):

$$B \geq B_{lsw} + B_{id} + B_{fu} \qquad (1),$$

wherein B denotes the width of the slope surface of the wall slope 121, $B_{lsw}$ denotes a maximum width of the second flexible net fixed to the slope surface 121 of the slope impact testing unit 120, $B_{id}$ denotes a maximum width for installing the impact monitoring unit on the wall slope 121, $B_{fu}$ denotes an excess width taking other factors into account, and 1 m ≤ $B_{fu}$ ≤ 5 m.

In some embodiments, a height of the slope surface of the wall slope 121 satisfies a relationship represented by Equation (2):

$$H_{xp} \geq l \times \sin \beta + H_{fu} \qquad (2),$$

wherein, $H_{xp}$ denotes the height of the slope surface of the wall slope 121, l denotes a maximum length of the second flexible net at a time of a test on the wall slope 121, β denotes a slope angle of the wall slope 121, $H_{fu}$ denotes an excess height taking other factors into account, and 1 m ≤ $H_{fu}$ ≤ 3 m.

The impact simulation unit 130 is a unit for simulating an impact process of an impactor on the flexible net. The first flexible net and the second flexible net may be collectively referred to as the flexible net.

The impactor may be in a variety of structural forms such as a sphere, a cube, or the like. A volume, a weight, a material, a density, or the like of the impactor may be set according to actual experimental needs.

In some embodiments, the impact simulation unit 130 includes an impact assembly 132 and a lifting assembly 131.

The lifting assembly 131 is a component for lifting the impactor. The lifting assembly 131 may lift the impactor to a certain height.

In some embodiments, the lifting assembly 131 may be provided close to the gravity wall 111 and the wall slope 121, and the lifting assembly 131 may be configured to lift the impactor performing the slope impact test to the impact assembly 132, and lift an impactor performing the vertical impact test to a predetermined position and release the impactor. When the lifting assembly 131 lifts the impactor performing the vertical impact test to the predetermined position and releases the impactor, the impactor performing the vertical impact test falls freely until it is caught by the first flexible net.

In some embodiments, a height of the predetermined position may be not less than 100 m. The height of the predetermined position refers to a vertical distance of the predetermined position from the horizontal plane. In some embodiments, the height of the predetermined position may be not less than one of 50 m, 55 m, 60 m, 65 m, 70 m, 75 m, 80 m, 85 m, 90 m, 95 m, 105 m, 110 m, 115 m, 120 m, 125 m, 130 m, or the like.

In some embodiments, an impact velocity of the impactor performing the vertical impact test may be adjusted by adjusting the height of the predetermined position.

In some embodiments, the impact velocity of the impactor performing the vertical impact test may be not less than 35 m/s. In some embodiments, the impact velocity of the impactor performing the vertical impact test may be not less than one of 34 m/s, 33 m/s, 32 m/s, 31 m/s, 30 m/s, 36 m/s, 37 m/s, 38 m/s, 39 m/s, 40 m/s, or the like.

In some embodiments, the lifting assembly 131 may include a hoist, or the like.

In some embodiments, the lifting assembly 131 includes a support body and a hoisting device. More descriptions of this embodiment may be found in FIG. 2 and its related descriptions.

The impact assembly 132 may be configured to provide an impact angle and an impact velocity for the impactor performing the slope impact test. In some embodiments, the impact assembly 132 is disposed on the slope surface of the wall slope 121. For example, the impact assembly 132 may be disposed on a top of the slope surface of the wall slope 121.

Figure 3:
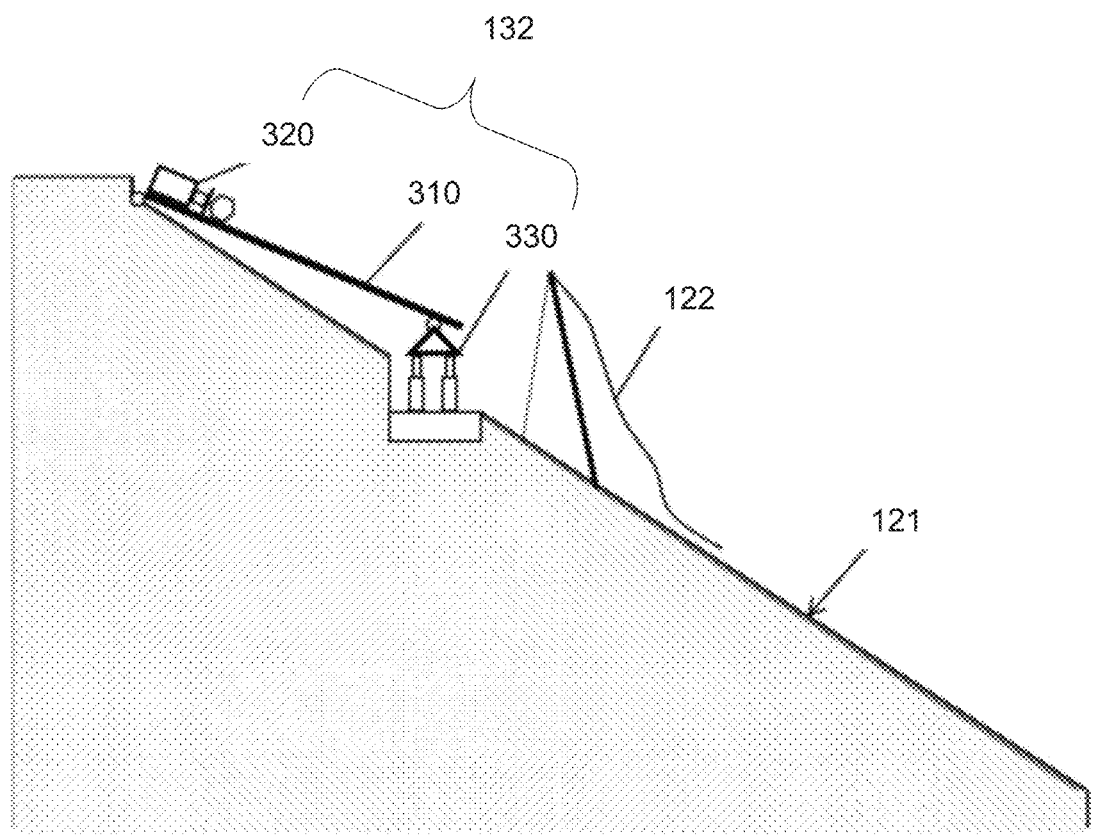
FIG. 3 is a schematic structural diagram of an impact assembly according to some embodiments of the present disclosure.

Referring to FIG. 3, in some embodiments, the impact assembly 132 includes a power device 320, a support plate 310, and a driving device 330. An upper end of the support plate 310 is rotationally connected to the slope surface of the wall slope 121, and a lower end of the support plate 310 is movably connected to an output end of the driving device 330. The driving device 330 is provided on the slope surface of the wall slope 121 to adjust an angle between the support plate 310 and the slope surface of the wall slope 121, thereby providing the impact angle for the impactor performing the slope impact test. The power device 320 is fixed to the upper end of the support plate 310, and an output end of the power device 320 is configured to apply an impact velocity parallel to the support plate 310 to the impactor performing the slope impact test.

The support plate 310 is a component for adjusting the impact angle of the impactor performing the slope impact test. The impactor performing the slope impact test may be placed on an upper surface of the support plate 310.

In some embodiments, the upper end of the support plate 310 may be rotationally connected to the slope surface of the wall slope 121 in various ways. For example, the upper end of the support plate 310 and the slope surface of the wall slope 121 may be rotationally connected via a bearing or the like.

In some embodiments, the lower end of the support plate 310 is movably connected to the output end of the driving device 330.

The upper end of the support plate 310 is an end of the support plate 310 near the top of the slope surface of the wall slope 121, and the lower end of the support plate 320 is an end of the support plate 310 away from the top of the slope surface of the wall slope 121.

The power device 320 is a device for propelling the impactor performing the slope impact test. In some embodiments, the power device 320 may propel the impactor performing the slope impact test to move downwardly on the slope surface of the wall slope 121. In some embodiments, the power device 320 may apply a force (e.g., a pushing force, etc.) to the impactor performing the slope impact test to adjust the impact velocity of the impactor.

In some embodiments, the power device 320 may be disposed at the upper end of the support plate 310 and on the upper surface of the support plate 310.

In some embodiments, the force output by the power device 310 and an impact energy of the slope impact testing unit 120 satisfy a relationship represented by Equation (3):

$$F = \frac{\sqrt{2mE}}{t} - \frac{mg}{\cos(90° - \beta_1 + \beta_2)}, \quad (3)$$

wherein E denotes the impact energy, F denotes the force output by the power device, t denotes a duration of the force exerted by the power device on the impacting object, m denotes a mass of the impactor, g denotes the gravitational acceleration, $\beta_1$ denotes the angle between the slope surface of the wall slope and the horizontal plane, and $\beta_2$ denotes the angle between the support plate and the slope surface of the wall slope.

In some embodiments, the impact velocity of the impactor performing the slope impact test may be adjusted by adjusting the power of the power device 310. In some embodiments, the impact velocity of the impactor performing the slope impact test may also be adjusted by adjusting the angle between the support plate 310 and the slope surface of the wall slope 121.

In some embodiments, the impact velocity of the impactor performing the slope impact test may be not less than 35 m/s. In some embodiments, the impact velocity of the impactor performing the slope impact test may be not less than one of 34 m/s, 33 m/s, 32 m/s, 31 m/s, 30 m/s, 36 m/s, 37 m/s, 38 m/s, 39 m/s, 40 m/s, or the like.

The driving device 330 is a device for adjusting a position of the lower end of the support plate 310.

In some embodiments, the output end of the driving device 330 may be secured with a roller that rests against a bottom surface of the lower end of the support plate 310. The roller may support the support plate while ensuring that the support plate may be adjusted at different angles under an action of the driving device 330.

In some embodiments, the bottom surface of the lower end of the support plate 310 is provided with at least two parallel slide rails that extend from the upper end of the support plate 310 to the lower end of the support plate 310. Each of the at least two slide rails is provided with a slide, and all slides are fixedly coupled to a fixing rod that is rotationally connected to the output end of the driving device 330.

In some embodiments, the impact angle of the impactor performing the slope impact test may be adjusted by adjusting the angle between the support plate 310 and the slope surface of the wall slope 121. In some embodiments, an impact angle of the impact assembly may be in a range of 45° to 70°. In some embodiments, the impact angle of the impact assembly may be in one of the following ranges of: 45° to 47.5°, 45° to 50°, 45° to 52.5°, 45° to 55°, 45° to 57.5°, 45° to 60°, 45° to 62.5°, 45° to 65°, 45° to 67.5°, 47.50 to 50°, 47.5° to 52.5°, 47.5° to 55°, 47.5° to 57.5°, 47.5° to 60°, 47.5° to 62.5°, 47.5° to 650, 47.5° to 67.5°, 47.5° to 70°, 50° to 52.5°, 50° to 55°, 50° to 57.5°, 50° to 60°, 50° to 62.50, 50° to 65°, 50° to 67.5°, 50° to 70°, 52.5° to 55°, 52.5° to 57.5°, 52.5° to 60°, 52.5° to 62.50, 52.5° to 65°, 52.5° to 67.5°, 52.5° to 70°, 55° to 57.5°, 55° to 60°, 55° to 62.5°, 55° to 650, 55° to 67.5°, 55° to 70°, 57.5° to 60°, 57.5° to 62.5°, 57.5° to 65°, 57.5° to 67.5°, 57.50 to 70°, 60° to 62.5°, 60° to 65°, 60° to 67.5°, 60° to 70°, 62.5° to 65°, 62.5° to 67.5°, 62.50 to 70°, 65° to 67.5°, 65° to 70°, 67.5° to 70°, or the like. In some embodiments, the impact angle of the impact assembly may be one of 45°, 47.5°, 50°, 52.5°, 55°, 57.5°, 60°, 62.5°, 65°, 67.5°, 70°, or the like.

In some embodiments of the present disclosure, by providing the impact assembly, impact resistance tests may be carried out at different impact velocities and impact angles based on the slope impact testing unit. In some embodiments of the present disclosure, the slope impact test may achieve impacts at various angles ranging from 45° to 70°, with impact energy reaching up to 5000 kJ.

The impact monitoring unit 140 is a unit for monitoring conditions related to the flexible net (including the first flexible net and the second flexible net) when the flexible net is impacted. In some embodiments, the impact monitoring unit 140 may be configured to monitor a deformation result and an internal force change result of the first flexible net and a deformation result and an internal force change result of the second flexible net.

In some embodiments, the impact monitoring unit 140 may include a deformation sensor, a tensile sensor, or the like. The deformation sensor and the tensile sensor may be provided on the flexible net to monitor the deformation result and the internal force change result of the flexible net.

In some embodiments, the impact monitoring unit includes a plurality of image acquisition assemblies and a plurality of tensile sensors. More descriptions of this embodiment may be found in FIG. 2 and the related descriptions.

In some embodiments of the present disclosure, passive protection nets, barrier nets, or the like may be deployed in the vertical impact testing unit and the slope impact testing unit, so that ultra-high energy vertical impact load tests may be conducted in the vertical impact testing unit, and slope impact tests under different impact conditions may be conducted in the slope impact testing unit. Through real-time monitoring data obtained by the impact monitoring unit, stress states of the passive protection network and the barrier net can be analyzed. In addition, based on the arrangement of the wall slope and impact assembly, the support plate can be adjusted according to a desired impact angle during slope impact tests, ensuring that the impactor achieves a target impact angle when performing the impact tests.

Figure 2:
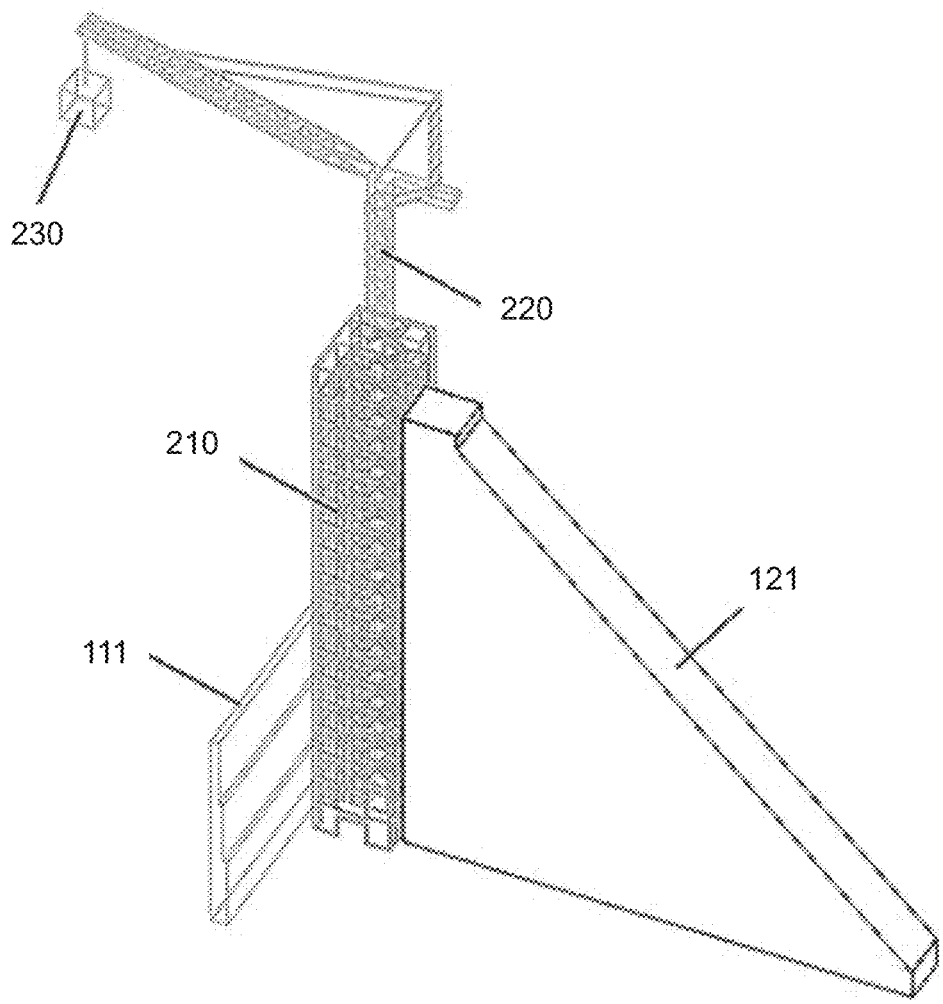
FIG. 2 is a schematic structural diagram of a system for impact testing and monitoring of a high-energy flexible net according to some embodiments of the present disclosure.

FIG. 2 is a schematic structural diagram of a system for impact testing and monitoring of a high-energy flexible net according to some embodiments of the present disclosure.

As shown in FIG. 2, in some embodiments, the lifting assembly 131 includes the support body 210 and the hoisting device 220, the support body 210 being disposed between a second side of the gravity wall 111 and the wall slope 121. In some embodiments, the hoisting device 220 is a tower crane. The hoisting device 220 includes a tower crane column provided at a top of the support body 210, a slewing mechanism, and a movable arm, the movable arm being rotationally fixed to a top of the tower crane column by the slewing mechanism, and the movable arm is rotationally provided on the slewing mechanism in a direction perpendicular to a horizontal plane.

The support body 210 is configured to support the hoisting device 220. The hoisting device 220 is configured to lift an impactor 230.

In some embodiments, a height of the tower crane column may be in a range of 20 m to 25 m, and a lifting capacity of the tower crane column may be in a range of 20 t to 100 t. In some embodiments, a vertical lifting angle of the movable arm may be in a range of 15° to 85°, a length of the movable arm may be in a range of 40 m to 65 m, a lifting capacity at an end of the movable arm may be in a range of 6 t to 20 t, and a horizontal rotational angle of the movable arm may range up to 360°.

Since conventional cranes may not meet requirements for ultra-high energy impact tests, some embodiments described in the present disclosure involve a customized tower crane, which is able to lift an impactor of a predetermined weight to a predetermined height, giving the impactor ultra-high energy, thereby meeting the requirements of ultra-high energy impact tests.

Additionally, since it is difficult to achieve ultra-high energy impacts by merely improving the hoisting device, the present disclosure includes the support body configured to support the hoisting device in addition to improving the conventional cranes. The support body works in conjunction with the hoisting device to facilitate ultra-high energy impact tests.

In some embodiments, the support body 210 may be a cylindrical tower structure formed by double-layered shear walls including an inner shear wall and an outer shear wall. As shown in FIG. 2, in some embodiments, the tower structure is provided with a plurality of floors along a height direction of the tower structure, the plurality of floors being enclosed by the double-layered shear walls and a plurality of floor surfaces spaced apart along the height direction. The outer shear wall of the support body 210 is provided with a plurality of sets of openings in the height direction, each set of the plurality of sets of openings being provided on the outer shear wall between adjacent floors and corresponding to one of the plurality of floors.

In some embodiments, a height of the support body 210 may be in a range of 62 m to 66 m, a count of the plurality of floors may be in a range of 16 to 20 floors, and a height of each of the plurality of floors may be in a range of 3.1 m to 4.1 m. A length of the outer layer of the cylindrical tower structure may be in a range of 11 m to 12 m, and a width of the outer layer of the cylindrical tower structure may be in a range of 8.5 m to 9.5 m. A length of the inner layer of the cylindrical tower structure may be in a range of 2 m to 3 m, a width of the inner layer of the cylindrical tower structure may be in a range of 2 m to 3 m, and a thickness of the inner shear wall may be in a range of 35 cm to 45 cm. Preferably, the height of the support body may be 64.8 m, and the count of the plurality of floors may be 18 floors, and the height of each of the plurality of floors may be 3.6 m; the length of the outer layer of the cylindrical tower structure may be 11.4 m and the width of the outer layer of the cylindrical tower structure may be 9 m; the length of the inner layer of the cylindrical tower structure may be 2.5 m, the width of the inner layer of the cylindrical tower structure may be 2.5 m, and thickness of the inner shear wall may be 40 cm.

In some embodiments of the present disclosure, the structure of the hoisting device and the corresponding specification parameters are configured so that the hoisting device may have a large load-bearing capacity to meet the requirements of high-energy impact tests. The tower structure is universally applicable as it is not dependent on natural terrain. By configuring the support body as the cylindrical tower structure formed by double-layered shear walls, the lifting capacity of the support body can be improved with a relatively low cost, allowing the support body to cooperate with the hoisting device to complete high-energy impact tests. In addition, the specification parameters of the support body may be configured to ensure that the support body has a relatively large height (i.e., high energy level) at a low cost. Moreover, by providing a set of openings at each floor, a wind resistance capacity of the support body can be improved while lowering the cost of the support body.

In practical application scenarios, to satisfy the requirements of vertical impact tests of different ultra-high energy levels, the vertical lifting angle of the movable arm of the hoisting device may be determined according to the impact energy corresponding to the required ultra-high energy level, so as to make the impactor impacting the flexible net with a corresponding energy level. In some embodiments, the vertical lifting angle of the movable arm and the impact energy of the vertical impact testing unit satisfy a relationship represented by Equation (4):

$$\alpha = \arcsin\left(\frac{W}{mgL_{db}} - \frac{H_{tl} + H_{tdlz} - H_{ds} - H_{bhc}}{L_{db}}\right), \quad (4)$$

wherein $\alpha$ denotes the vertical lifting angle of the movable arm, W denotes the impact energy of the vertical impact testing unit, m denotes a mass of the impactor performing the vertical impact test, g denotes the gravitational acceleration, $L_{db}$ denotes a length of the movable arm, $H_{tl}$ denotes a height of the support body 210, $H_{tdlz}$ denotes a height of the tower crane column, $H_{ds}$ denotes a vertical height between the impactor performing the vertical impact test and the movable arm, and $H_{bhc}$ denotes a buffering distance of the first flexible net.

In some embodiments of the present disclosure, through the above customized configuration of the support body and the hoisting device, it is possible to make the impact energy level of the vertical impact test reach to 20,000 kJ and make the impact velocity reach 44.72 m/s, breaking through the limitations of existing test platforms. Additionally, based on the required impact energy for the slope impact test and the determined impact angle, the output force of the power device may be adjusted to ensure that the impactor achieves the target impact angle and energy level under the action of the impact assembly, thereby successfully completing the slope impact test at the corresponding energy level for the flexible net.

Figure 4:
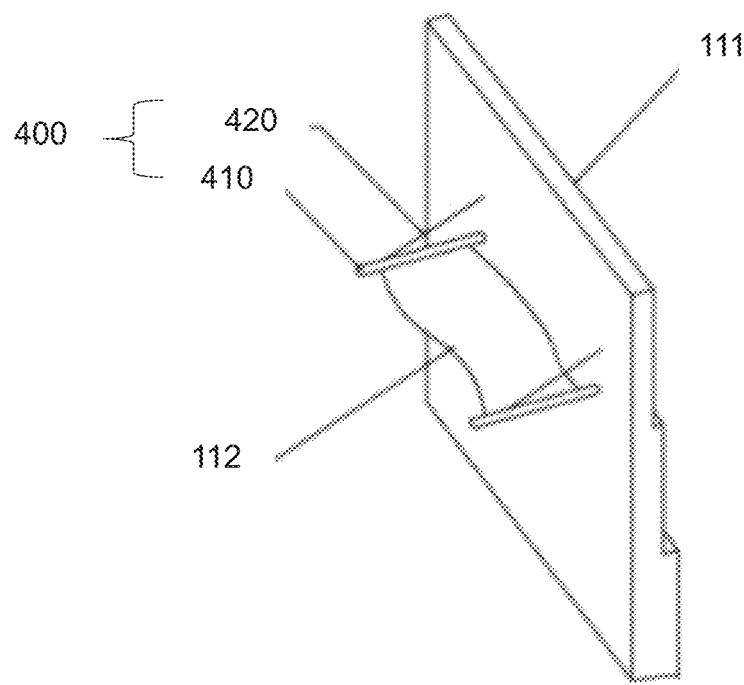
FIG. 4 is a schematic structural diagram of a first fixing structure according to some embodiments of the present disclosure.
Figure 5:
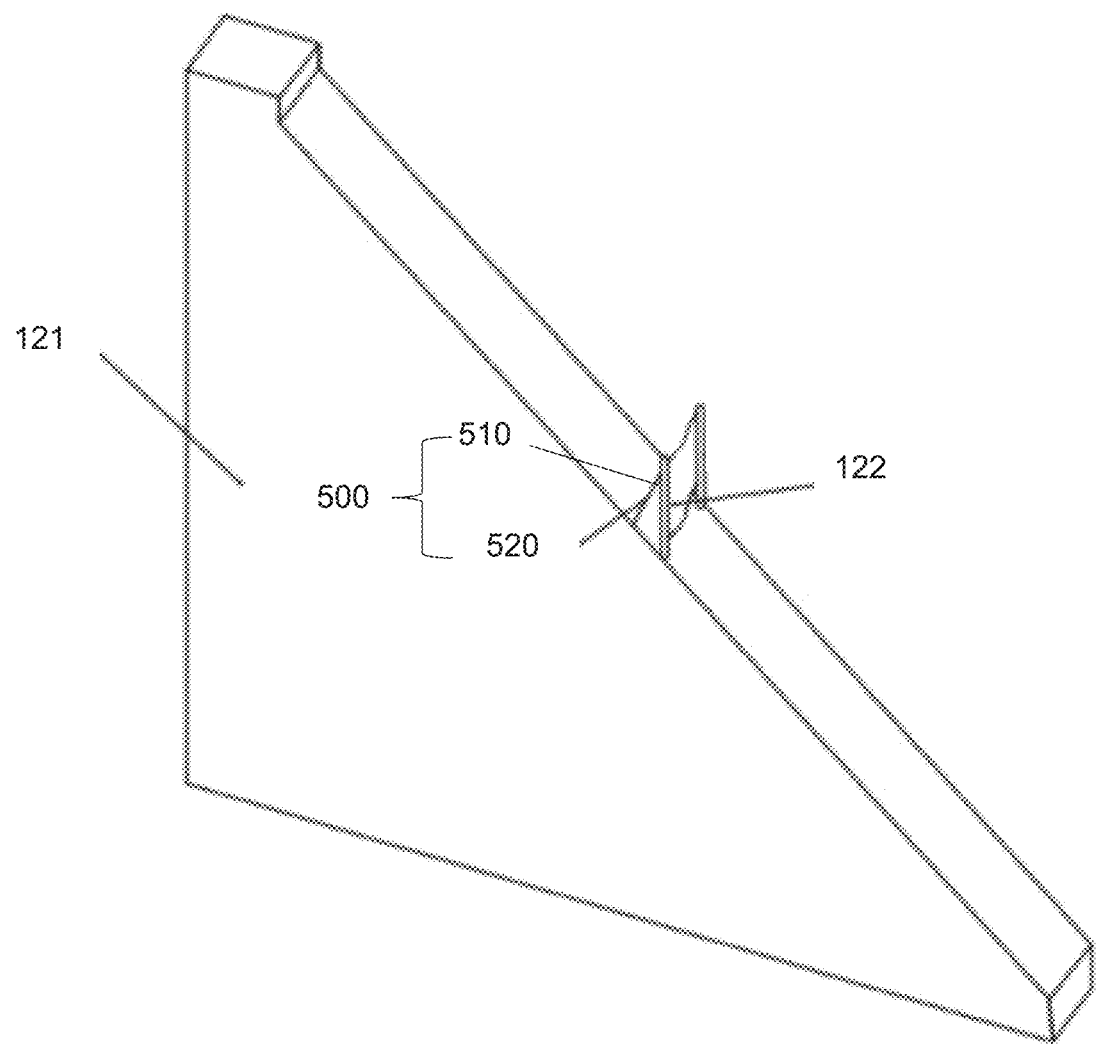
FIG. 5 is a schematic structural diagram of a second fixing structure according to some embodiments of the present disclosure.

FIG. 4 is a schematic structural diagram of a first fixing structure according to some embodiments of the present disclosure. FIG. 5 is a schematic structural diagram of a second fixing structure according to some embodiments of the present disclosure.

As shown in FIG. 4, in some embodiments, a first flexible net 112 is fixed to the gravity wall 111 by a first flexible structure 400.

The first flexible structure 400 is configured to fix the first flexible net 112 to the gravity wall 111.

In some embodiments, the first flexible structure 400 includes a plurality of first columns 410 and a plurality of first cables 420.

The first column 410 is a structure for securing the first flexible net 112. The first column 410 may be a steel column, an anchor, or the like. In some embodiments, a length of each of the plurality of first columns 410 may be greater than or equal to a width of the first flexible net 112.

As shown in FIG. 4, in some embodiments, the plurality of first columns 410 are vertically fixed to the gravity wall 111 and arranged in a same plane parallel to a horizontal plane. For example, the plurality of first columns 410 may be fixed to the gravity wall 111 by bolts.

In some embodiments, a spacing between two adjacent first columns 410 of the plurality of first columns 410 may be in a range of 4 m to 6 m. In some embodiments, the spacing between two adjacent first columns 410 of the plurality of first columns 410 may be in one of the following ranges of: 4 m to 5.8 m, 4 m to 5.6 m, 4 m to 5.4 m, 4 m to 5.2 m, 4 m to 5 m, 4 m to 4.8 m, 4 m to 4.6 m, 4 m to 4.4 m, 4 m to 4.2 m, 4.2 m to 6 m, 4.2 m to 5.8 m, 4.2 m to 5.6 m, 4.2 m to 5.4 m, 4.2 m to 5.2 m, 4.2 m to 5 m, 4.2 m to 4.8 m, 4.2 m to 4.6 m, 4.2 m to 4.4 m, 4.4 m to 6 m, 4.4 m to 5.8 m, 4.4 m to 5.6 m, 4.4 m to 5.4 m, 4.4 m to 5.2 m, 4.4 m to 5 m, 4.4 m to 4.8 m, 4.4 m to 4.6 m, 4.6 m to 6 m, 4.6 m to 5.8 m, 4.6 m to 5.6 m, 4.6 m to 5.4 m, 4.6 m to 5.2 m, 4.6 m to 5 m, 4.6 m to 4.8 m, 4.8 m to 6 m, 4.8 m to 5.8 m, 4.8 m to 5.6 m, 4.8 m to 5.4 m, 4.8 m to 5.2 m, 4.8 m to 5 m, 5 m to 6 m, 5 m to 5.8 m, 5 m to 5.6 m, 5 m to 5.4 m, 5 m to 5.2 m, 5.2 m to 6 m, 5.2 m to 5.8 m, 5.2 m to 5.6 m, 5.2 m to 5.4 m, 5.4 m to 6 m, 5.4 m to 5.8 m, 5.4 m to 5.6 m, 5.6 m to 6 m, 5.6 m to 5.8 m, 5.8 m to 6 m, or the like. In some embodiments, the spacing between two adjacent first columns 410 of the plurality of first columns 410 may be one of 4 m, 4.2 m, 4.4 m, 4.6 m, 4.8 m, 5 m, 5.2 m, 5.4 m, 5.8 m, 6 m, or the like.

In some embodiments, the first flexible net 112 may be fixedly connected with the plurality of first columns 410. For example, the first flexible net 112 may be tied to the plurality of first columns 410.

The first cable 420 is a structure for securing the first column 410 to the first side of the gravity wall 111. In some embodiments, a top of each of the plurality of first columns 410 may be fixed to one end of at least one of the plurality of first cables 420, another end of the at least one of the plurality of first cables 420 may be fixed to the first side of the gravity wall 111.

In some embodiments, during construction of the gravity wall 111, anchor holes may be pre-set on the gravity wall 111, with a certain spacing between adjacent anchor holes, and all the anchor holes on the gravity wall 111 may be arranged in a matrix structure with equal horizontal and vertical spacing. For example, steel pipes with a diameter of 63 mm and a wall thickness of 3 mm may be preset in advance on the gravity wall 111 as the anchor holes. As another example, adjacent anchor holes may be spaced apart with a spacing of 0.5 m. In addition, bolt holes may be pre-set on the gravity wall 111. The pre-set bolt holes may be configured to fix the first columns 410.

When fixing the first flexible net 112 to the gravity wall 111 of the vertical impact testing unit 110, the plurality of first columns 410 are fixed to the gravity wall 111 by bolts, and the first flexible net 112 is fixed to the plurality of first columns 410. Then, through the cooperation of the plurality of first cables 420 and the anchor holes, the tensile fixation of the first columns 410 is achieved.

In some embodiments, decompression rings may be provided on the plurality of first cables 420. For example, each of the plurality of first cables 420 may be provided with at least one decompression ring. The decompression ring may have a cushioning effect when pulling of the first column 410 is achieved by the first cable 420.

As shown in FIG. 5, in some embodiments, the second flexible net 122 is fixed to the wall slope 121 by a second fixing structure 500.

The second fixing structure 500 is configured to fix the second flexible net 122 to the wall slope 121.

In some embodiments, the second fixing structure 500 may include a plurality of second columns 510 and a plurality of second cables 520.

The second column 510 is a structure for supporting the second flexible net 122. The second column 510 may be a steel column, an anchor, or the like.

In some embodiments, the plurality of second columns 510 may be fixed to the wall slope 121. In some embodiments, the plurality of second columns 510 may be fixed vertically to the slope surface of the wall slope 121. In some embodiments, the plurality of second columns 510 may be fixed obliquely to the slope surface of the wall slope 121. For example, the plurality of second columns 510 may be perpendicular to the horizontal plane and fixed to the slope surface of the wall slope 121. At this point, the plurality of second columns 510 are fixed obliquely to the slope surface of the wall slope 121.

The second cable 520 is a structure for fixing at least one of the second column 510 or the second flexible net 122 to the slope surface of the wall slope 121.

As shown in FIG. 5, in some embodiments, one end of each of the plurality of second cables 520 is fixed to the slope surface of the wall slope 121, another ends of a portion of the plurality of second cables 520 are fixed to a top of one of the plurality of second columns 510, and another end of each second cable 520 of the remaining portion of the plurality of second cables 520 is fixed to the second flexible net 122. In some embodiments, the top of each of the plurality of second columns 510 is fixed to one end of at least one of the plurality of second cables 520.

In some embodiments, anchor holes may be pre-set on the gravity wall 111, with a certain spacing between adjacent anchor holes, and all the anchor holes on the gravity wall 111 may be arranged in a matrix structure with equal horizontal and vertical spacing. For example, steel pipes with a diameter of 63 mm and a wall thickness of 3 mm may be preset in advance on the gravity wall 111 as the anchor holes. As another example, adjacent anchor holes may be spaced apart with a spacing of 0.5 m. In addition, bolt holes may be preset on the gravity wall 111. The preset bolt holes may be configured to fix the first columns 510.

When fixing the second flexible net 122 to the wall slope 121 of the slope impact testing unit 120, one end of each of the plurality of second cables 520 may be bolted to one of the preset anchor holes, and other end of each of a portion of the plurality of second cables 520 may be secured to the second flexible net 122 through a locking clip. In addition, one end of each of the plurality of second columns 510 may be secured to the slope surface of the wall slope 121 through one of the preset bolt holes, and another end of t each of the plurality of second columns 510 may be secured to the second flexible net 122 and the remaining portion of the plurality of second cables 520.

In some embodiments, each of the plurality of second cables 520 may be provided with at least one decompression ring. The decompression ring may have a buffering effect when the pulling of the second column 510 is achieved by the second cable 520.

In practical application scenarios, the first flexible net 112 is fixed to the gravity wall 111 by the first fixing structure 400, which may form structures such as a passive protection net or a barrier net. The second flexible net 122 is fixed to the wall slope 121 by the second fixing structure 500, which may form structures such as a curtain net.

In some embodiments of the present disclosure, by fixing the first flexible net 112 to the gravity wall 111 via the first fixing structure 400 to form structures such as the passive protection net or the barrier net, and by fixing the second flexible net 122 to the wall slope 121 via the second fixing structure 500 to form structures such as the curtain net, it is possible to help the vertical impact testing unit and the slope impact testing unit to carry out impact load tests.

In some embodiments, the impact monitoring unit 140 includes a plurality of image acquisition assemblies (not shown in the accompanying drawings) and a plurality of tensile sensors (not shown in the accompanying drawings).

The image acquisition assemblies may be configured to acquire image data when the flexible net is subjected to impact. In some embodiments, the image acquisition assemblies may include at least one type of high-speed cameras, laser scatter imaging devices, infrared imaging devices, or the like.

In some embodiments, the plurality of image acquisition assemblies may be secured to the gravity wall 111 and the slope surface of the wall slope 121. In some embodiments, the image acquisition assemblies may be arranged along a circumferential direction of the flexible net on the gravity wall and the wall slope.

In some embodiments, locations of the image acquisition assemblies disposed on the slope surface of the gravity wall and the wall slope may be determined according to actual situations to monitor the deformation of the flexible net. For example, the image acquisition assemblies may be arranged in a plane where the flexible net is located and monitored toward the plane where the flexible net is located.

The tensile sensors may be configured to monitor an internal force change result of the flexible net.

In some embodiments, the tensile sensors may be secured to the first cables 420 and the second cables 520.

In some embodiments, the tensile sensors may also be disposed between the first flexible net 112 and the first columns 410, or between the second flexible net 122 and the second column 510. In some embodiments, the first flexible net 112 may be secured to the first columns 410 by anchors, and the second flexible net 122 may be secured to the second columns 510 by anchors. The anchors may be used to lock strands of the flexible net. In practical application scenarios, the tensile sensors may be provided between the first columns 410 and the anchors or between the second columns 510 and the anchors.

In some embodiments, the impact monitoring unit 140 may also include a vibration sensor and a strain sensor. The vibration sensor may detect a vibration condition after the flexible net is impacted, and the strain sensor may detect a strain condition after the flexible net is impacted.

In some embodiments, the impact monitoring unit 140 may be provided with a processor. The processor may analyze and process data collected by the image acquisition assemblies and the tensile sensors to determine a deformation result and the internal force change result of the flexible net. More descriptions of determining the deformation result and the internal force change result of the flexible net may be found in FIG. 6 and its associated descriptions.

Through the analysis of the monitoring data obtained from the impact tests, the impact energy level of a target structure (e.g., the flexible net) is examined, and a working stress state of the target structure, such as the impact energy level, a deformation, an internal force, and an overall stress state of the target structure is obtained, so as to provide data support for the optimization of the target structure. The present disclosure does not limit monitoring devices for obtaining the monitoring data in the impact tests, as long as the monitoring devices may realize corresponding functions. For different test requirements, the monitoring devices may be configured based on detection principles corresponding to required monitoring data, so as to obtain the required monitoring data and achieving the impact test on the flexible net.

In some embodiments, in order to enable the vertical impact testing unit to carry out vertical impact tests of ultra-high energy levels, a width of the gravity wall may satisfy a relationship represented by Equation (5):

$$B_{zlq} \geq B_{bdw} + B_{bdwg} + B_{cgq} + B_{fu} \quad (5),$$

wherein $B_{zlq}$ denotes the width of the gravity wall, $B_{bdw}$ denotes a maximum width of the first flexible net fixed to the gravity wall, $B_{bdwg}$ denotes a width of the first fixing structure on an outer side of the first flexible net, $B_{cgq}$ denotes a width of the plurality of image acquisition assemblies on the gravity wall, $B_{fu}$ denotes an excess width, and $1 \text{ m} \leq B_{fu} \leq 5 \text{ m}$.

In some embodiments, in order to enable the vertical impact testing unit to carry out vertical impact tests of ultra-high energy levels, a height of the gravity wall may satisfy a relationship represented by Equation (6):

$$H_{zlq} \geq H_{bhc} + H_{cgq} + H_{fu} \quad (6),$$

wherein $H_{zlq}$ denotes the height of the gravity wall, $H_{bhc}$ denotes a maximum buffer distance of the first flexible net, $H_{cgq}$ denotes a height of the plurality of image acquisition assemblies on the gravity wall, $H_{fu}$ denotes an excess height, and $1 \text{ m} \leq H_{fu} \leq 3 \text{ m}$.

The height of the plurality of image acquisition assemblies is a vertical distance between the image acquisition assemblies and the horizontal plane.

In some embodiments, in order to enable the vertical impact testing unit to carry out vertical impact tests of ultra-high energy levels, a thickness of the gravity wall may satisfy a relationship represented by Equation (7):

$$S_{zlq} \geq \sqrt{\frac{W_{max}h}{\rho g H_{zlq} B_{zlq}}}, \quad (7)$$

wherein $S_{zlq}$ denotes the thickness of the gravity wall, $W_{max}$ denotes a maximum impact energy of the vertical impact testing unit, h denotes a height of the first flexible net, $\rho$ denotes a density of the impactor performing the vertical impact test, g denotes the gravitational acceleration, $H_{zlq}$ denotes the height of the gravity wall, and $B_{zlq}$ denotes the width of the gravity wall.

The height of the first flexible net is a vertical distance between the net surface of the first flexible net and the horizontal plane.

When fixing the flexible net to the gravity wall, if a length of the strand of the flexible net is 30 m, considering a strand elongation rate of 10% and the spacing of the first columns of 5 m, the maximum buffer distance of the first flexible net after impact is determined as 3.12 m. Considering a safety coefficient, the height of the first flexible net may be not less than 5 m, i.e., the height of the first flexible net on the gravity wall may be greater than the maximum buffer distance of the first flexible net.

In practical application scenarios, the thickness of the gravity wall may be gradually reduced upward along a height direction of the gravity wall, and a minimum thickness of the gravity wall may be required to satisfy Equation (7). In some embodiments, when constructing the gravity wall, the width and the height of the gravity wall may be determined based on the width (e.g., the maximum width) and the height of the first flexible net, and the minimum thickness of the gravity wall may be determined based on the width and the height of the gravity wall, as well as physical parameters of the impactor and the maximum impact energy required to conduct the vertical impact test. Finally, the gravity wall may be constructed based on the predetermined structure of the gravity wall as well as the determined width, height and minimum thickness of the gravity wall.

Figure 6:
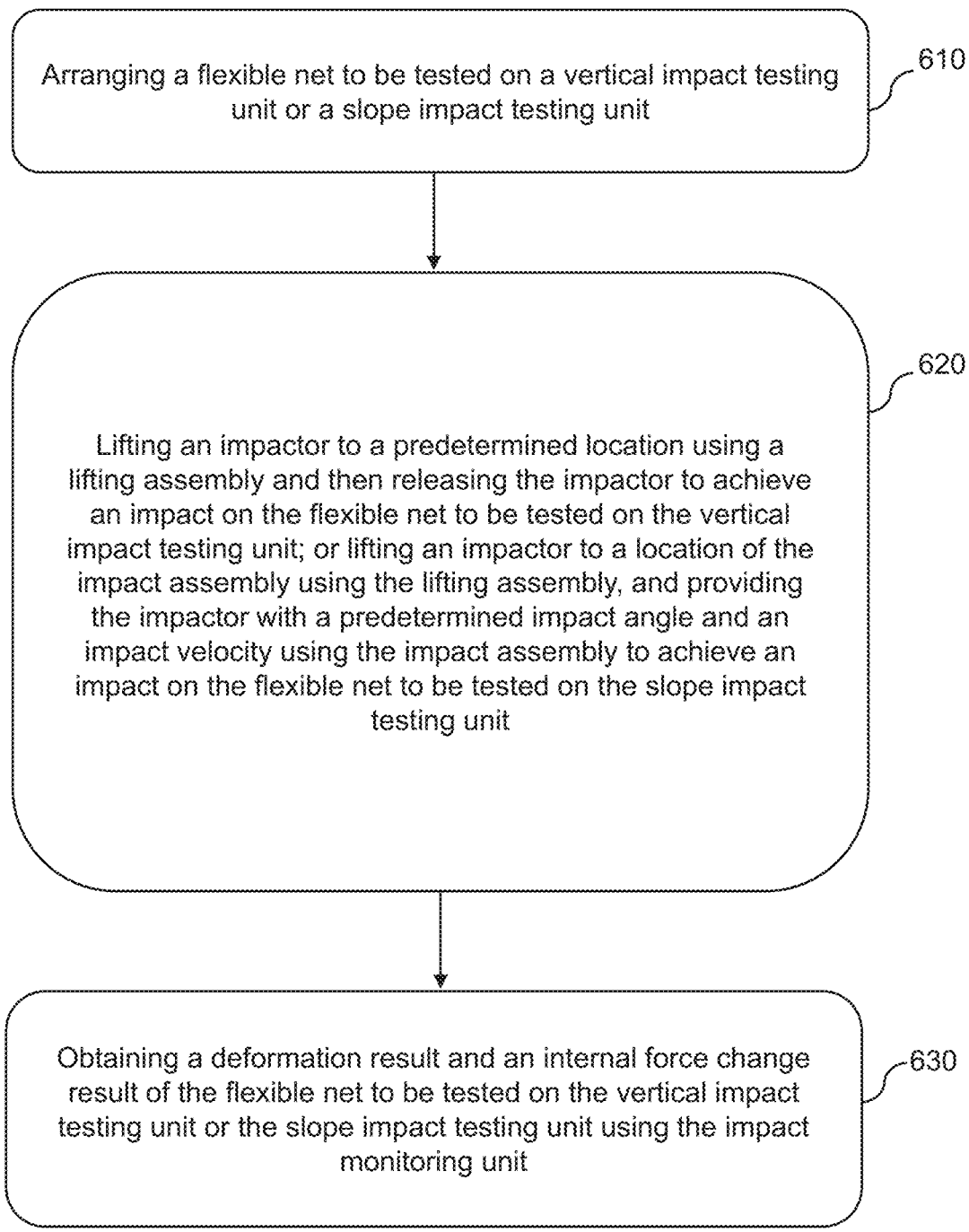
FIG. 6 is a flowchart of an exemplary process for impact testing and monitoring of a high-energy flexible net according to some embodiments of the present disclosure.

FIG. 6 is a flowchart of an exemplary process for impact testing and monitoring of a high-energy flexible net according to some embodiments of the present disclosure. Referring to FIG. 6, some embodiments of the present disclosure further provide a method for impact testing and monitoring of a high-energy flexible net. In some embodiments, process 600 may be implemented by the impact testing and monitoring system 100. As shown in FIG. 6, the process 600 includes the following operations.

In 610, arranging a flexible net to be tested on a vertical impact testing unit or a slope impact testing unit.

In some embodiments, a first flexible net used in a vertical impact test may be arranged on a gravity wall of the vertical impact testing unit. In some embodiments, a second flexible net used in a slope impact test may be arranged on a wall slope of the slope impact testing unit.

More descriptions of the vertical impact testing unit and the slope impact testing unit may be found in the relevant descriptions in FIGS. 1-5.

In 620, lifting an impactor to a predetermined location using a lifting assembly and then releasing the impactor to achieve an impact on the flexible net to be tested on the vertical impact testing unit; or lifting an impactor to a location of an impact assembly using the lifting assembly, and providing the impactor with a predetermined impact angle and an impact velocity using the impact assembly to achieve an impact on the flexible net to be tested on the slope impact testing unit.

In some embodiments, the lifting assembly may lift the impactor performing the vertical impact test to the predetermined position and then release the impactor to impact the first flexible net. In some embodiments, the lifting assembly may lift the impactor performing the slope impact test to the location of the impact assembly, and the impact assembly provides an impact angle and an impact velocity for the impactor performing the slope impact test for impacting the second flexible net.

More descriptions of the lifting assembly and the impact assembly may be found in related descriptions in FIGS. 1-3.

In 630, obtaining a deformation result and an internal force change result of the flexible net to be tested on the vertical impact testing unit or the slope impact testing unit using the impact monitoring unit.

In some embodiments, a plurality of image acquisition assemblies and a plurality of tensile sensors in the impact monitoring unit may acquire image data and sensing data when the flexible net to be tested on the vertical impact testing unit or the slope impact testing unit is impacted, and the tensile sensors in the impact monitoring unit may analyze and process the image data and the sensing data to determine the deformation result and the internal force change result of the flexible net to be tested.

The deformation result refers to a change in a shape of the flexible net to be tested when the flexible net to be tested is impacted. For example, the deformation result may include an amount of changes in the shape of the flexible net, or the like.

The internal force change result refers to a change in internal force when the flexible net to be tested is impacted. For example, the internal force change result may include a tension force, a peak tension force, a vibration, or the like monitored by the tensile sensors when the flexible net is impacted.

In some embodiments, the impact monitoring unit may be provided with a processor.

In some embodiments, the processor may utilize a Digital Image Correlation (DIC) technology to analyze and process the image data acquired by the image acquisition assemblies to determine the deformation result of the flexible net. In some embodiments, the processor may parse an optical signal and an infrared signal obtained by laser scatter imaging equipment, infrared imaging equipment, or the like to obtain corresponding test data, thereby analyzing curve data of the impact energy and displacement of the flexible net under different impact energy levels and impact velocities. In some embodiments, the processor may analyze the image data acquired by the high-speed cameras from multiple angles, perform geometric calculations, and acquire deformation data of the flexible net.

In some embodiments, the processor may parse electrical signals obtained by the tensile sensors, or the like, to obtain stress data of a first fixing structure, a second fixing structure, stranded wires in the flexible net, a plurality of first columns, a plurality of second columns, and anchoring works (e.g., anchors, etc). In some embodiments, the processor may parse the electrical signals obtained by a vibration sensor and a strain sensor, obtain the stress data of the first fixing structure, the second fixing structure, the stranded wires in the flexible net, the plurality of first columns, the plurality of second columns, and the anchoring works, and the anchoring works.

More descriptions of the impact monitoring unit, the image acquisition assemblies, the first fixing structure, the second fixing structure, the stranded wires in the flexible net, the first columns, the second columns, the anchoring works, and the tensile sensors may be found in the related descriptions of FIGS. 1-5.

In some embodiments of the present disclosure, the flexible net to be tested is arranged in the vertical impact testing unit and the slope impact testing unit. Ultra-high-energy vertical impact load tests may be conducted in the vertical impact testing unit, and slope impact load tests under various impact conditions may be conducted in the slope impact testing unit. The impact monitoring unit may collect real-time monitoring data, which may be used to analyze the stress state and deformation of the flexible net. By releasing impactors from different angles and heights, the impact testing and monitoring system can adjust the impact energy in the vertical impact testing unit and the slope impact testing unit, which allows for monitoring the deformation and stress state of the flexible net under different conditions, thereby improving monitoring accuracy.

Having thus described the basic concepts, it may be rather apparent to those skilled in the art after reading this detailed disclosure that the foregoing detailed disclosure is intended to be presented as illustrative example and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of the present disclosure.

Moreover, certain terminology has been configured to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this disclosure are not necessarily all referring to the same embodiment. Furthermore, the particular features, structures, or characteristics may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

As another example, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This way of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties configured to describe and claim certain embodiments of the present disclosure are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameter set forth in the written description and attached claims are approximations that may vary depending upon the desired properties sought to be obtained by a particular embodiment. In some embodiments, the numerical parameter should be construed in light of the number of reported significant digits and by applying ordinary rounding techniques. Notwithstanding that the numerical ranges and parameter setting forth the broad scope of some embodiments of the present disclosure are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the present disclosure disclosed herein are illustrating of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A system for impact testing and monitoring of a high-energy flexible net, wherein the system comprises a vertical impact testing unit, a slope impact testing unit, an impact simulation unit, and an impact monitoring unit;
   the vertical impact testing unit includes a vertically positioned gravity wall;
   the slope impact testing unit includes a wall slope, a first side of the gravity wall and a slope surface of the wall slope are securely provided with a flexible net, respectively, the wall slope being positioned perpendicularly to a second side of the gravity wall;

the impact simulation unit includes an impact assembly and a lifting assembly, wherein the impact assembly is provided on the slope surface of the wall slope and configured to provide an impact angle for an impactor performing a slope impact test, the impact assembly includes a power device, a support plate, and a driving device; an upper end of the support plate is rotationally connected to the slope surface of the wall slope, and a lower end of the support plate is movably connected to an output end of the driving device; the driving device is provided on the slope surface of the wall slope to adjust an angle between the support plate and the slope surface of the wall slope; the power device is fixed to the upper end of the support plate, and an output end of the power device is configured to apply an impact velocity parallel to the support plate to the impactor performing the slope impact test; and the lifting assembly is provided close to the gravity wall and the wall slope, the lifting assembly is configured to lift the impactor performing the slope impact test to the impact assembly, and lift an impactor performing a vertical impact test to a predetermined position and release the impactor; wherein a height of the predetermined position is not less than 100 m, the impact angle of the impact assembly is in a range of 45° to 70°, and an impact velocity of the impactor performing the vertical impact test and the impact velocity of the impactor performing the slope impact test are not less than 35 m/s; and the impact monitoring unit is configured to monitor a deformation result and an internal force change result of the flexible net.

2. The system of claim 1, wherein the slope surface of the wall slope is inclined downwardly in a direction away from the impact simulation unit, a width of the slope surface of the wall slope is in a range of 4 m to 6 m, an angle between the slope surface of the wall slope and a horizontal plane is in a range of 30° to 45°, and a projected length of the slope surface on the horizontal plane is in a range of 40 m to 60 m.

3. The system of claim 2, wherein the flexible net is fixed to the gravity wall by a first fixing structure, and the flexible net is fixed to the wall slope by a second fixing structure;

the first fixing structure includes a plurality of first columns and a plurality of first cables; the plurality of first columns are vertically fixed to the gravity wall and arranged in a plane parallel to the horizontal plane, and there is a spacing between two adjacent first columns of the plurality of first columns; a top of each of the plurality of first columns is fixed to one end of at least one of the plurality of first cables, another end of the at least one of the plurality of first cables is fixed to the first side of the gravity wall; and the second fixing structure includes a plurality of second columns and a plurality of second cables; the plurality of second columns are fixed to the wall slope, one end of each of the plurality of second cables is fixed to the slope surface of the wall slope; another ends of a portion of the plurality of second cables are fixed to a top of one of the plurality of second columns, and another end of each second cable of the remaining portion of the plurality of second cables is fixed to the flexible net.

4. The system of claim 3, wherein the impact monitoring unit includes a plurality of image acquisition assemblies and a plurality of tensile sensors, the plurality of image acquisition assemblies are fixed to the gravity wall and the slope surface of the wall slope to monitor the deformation result of the flexible net, and the plurality of tensile sensors are fixed to the plurality first cables and the plurality second cables to monitor the internal force change result of the flexible net.

5. The system of claim 4, wherein
a width of the gravity wall satisfies a relationship represented as:

$$B_{zlq} \geq B_{bdw} + B_{bdwg} + B_{cgq} + B_{fu}$$

wherein $B_{zlq}$ denotes the width of the gravity wall, $B_{bdw}$ denotes a maximum width of the flexible net fixed to the gravity wall, $B_{bdwg}$ denotes a width of the first fixing structure on an outer side of the flexible net fixed to the gravity wall, $B_{cgq}$ denotes a width of the plurality of image acquisition assemblies on the gravity wall, $B_{fu}$ denotes an excess width, and 1 m≤$B_{fu}$≤5 m;

a height of the gravity wall satisfies a relationship represented as:

$$H_{zlq} \geq H_{bhc} + H_{cgq} + H_{fu}$$

wherein $H_{zlq}$ denotes the height of the gravity wall, $H_{bhc}$ denotes a maximum buffer distance of the flexible net fixed to the gravity wall, $H_{cgq}$ denotes a height of the plurality of image acquisition assemblies on the gravity wall, $H_{fu}$ denotes an excess height, and 1 m≤$H_{fu}$≤3 m; and a thickness of the gravity wall satisfies a relationship represented as:

$$S_{zlq} \geq \sqrt{\frac{W_{max} h}{\rho g H_{zlq} B_{zlq}}}$$

wherein $S_{zlq}$ denotes the thickness of the gravity wall, $W_{max}$ denotes a maximum impact energy of the vertical impact testing unit, h denotes a height of the flexible net fixed to the gravity wall, $\rho$ denotes a density of the impactor performing the vertical impact test, g denotes a gravitational acceleration, $H_{zlq}$ denotes the height of the gravity wall, and $B_{zlq}$ denotes the width of the gravity wall.

6. The system of claim 5, wherein the lifting assembly includes a support body and a hoisting device, the support body is provided between the second side of the gravity wall and the wall slope, the hoisting device is a tower crane, the tower crane including a tower crane column provided at a top of the support body, a slewing mechanism, and a movable arm, wherein the movable arm is rotationally fixed to a top of the tower crane column by the slewing mechanism and is rotationally provided on the slewing mechanism in a direction perpendicular to the horizontal plane.

7. The system of claim 6, wherein the support body is a cylindrical tower structure formed by double-layered shear walls including an inner shear wall and an outer shear wall, and the tower structure is provided with a plurality of floors along a height direction of the tower structure, the plurality of floors being enclosed by a plurality of floor surfaces spaced apart along the height direction and the double-layered shear walls, the outer shear wall of the support body is provided with a plurality of sets of openings in the height direction, each set of the plurality of sets of openings is provided on the outer shear wall between adjacent floors and correspond to one of the plurality of floors, respectively.

8. The system of claim 7, wherein a relationship between a vertical lifting angle of the movable arm and an impact energy of the vertical impact testing unit is represented as:

$$\alpha = \arcsin\left(\frac{W}{mgL_{db}} - \frac{H_{tl} + H_{tdlz} - H_{ds} - H_{bhc}}{L_{db}}\right)$$

wherein $\alpha$ denotes the vertical lifting angle of the movable arm, W denotes the impact energy of the vertical impact testing unit, m denotes a mass of the impactor performing the vertical impact test, g denotes the gravitational acceleration, $L_{db}$ denotes a length of the movable arm, $H_{tl}$ denotes a height of the support body, $H_{tdlz}$ denotes a height of the tower crane column, $H_{ds}$ denotes a vertical height between the impactor performing the vertical impact test and the movable arm, and $H_{bhc}$ denotes a buffering distance of the flexible net fixed to the gravity wall.

9. A method for impact testing and monitoring of a high-energy flexible net, wherein the method is implemented by using the system for impact test and monitoring of a high-energy flexible net of claim 1, and the method comprises:

arranging a flexible net to be tested on the vertical impact testing unit or the slope impact testing unit;

lifting an impactor to a predetermined location using the lifting assembly and then releasing the impactor to achieve an impact on the flexible net to be tested on the vertical impact testing unit; or lifting an impactor to a location of the impact assembly using the lifting assembly, and providing the impactor with a predetermined impact angle and an impact velocity using the impact assembly to achieve an impact on the flexible net to be tested on the slope impact testing unit; and obtaining a deformation result and an internal force change result of the flexible net to be tested on the vertical impact testing unit or the slope impact testing unit using the impact monitoring unit.

* * * * *